United States Patent Office 3,375,613
Patented Apr. 2, 1968

3,375,613
MACHINE FOR GRINDING PARTS ACCORDING TO A JIG CONTOUR
Pierre Boucher, Vignols, Correze, France
Filed Dec. 11, 1964, Ser. No. 417,713
6 Claims. (Cl. 51—101)

ABSTRACT OF THE DISCLOSURE

A grinding machine for forming parts according to a jig configuration. The jig and workpiece are mounted on a first shaft for simultaneous rotation and a driven grinding wheel and idler roller are mounted on a common axis parallel to the first shaft. The peripheral surface of the jig and idler roller is frusto-conical and the operative surface of the jig is a regulated surface coinciding to the tapering angle of the idler roller peripheral surface. The first shaft is mounted for movement in a direction to bring the jig into contact with the axis idler roller and the workpiece into contact with the grinding wheel. The roller is adjustably movable in an axial direction relative to the jig, providing variation in the size of the workpiece obtainable from a single roller.

---

Figure 1:
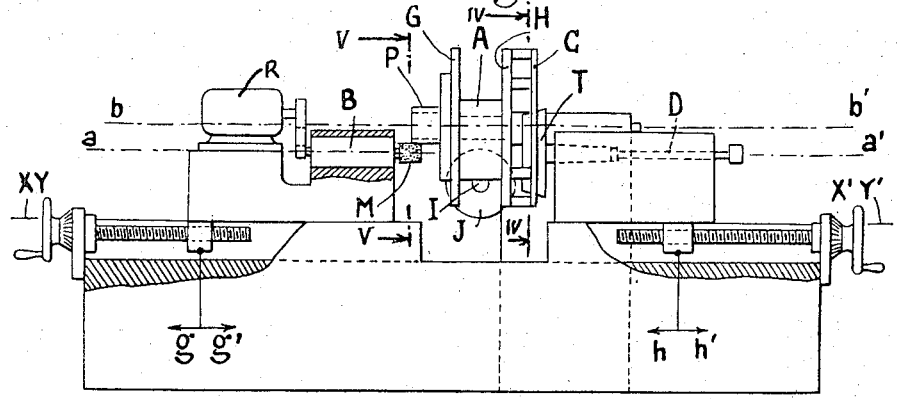

This invention relates in general to grinding machines or like machine tools for grinding or otherwise machining a part according to the contour of a jig to a predetermined diametral dimension.

The basic principle of this invention consists in mounting the part to be machined and a jig, on a first axis mounting a grinding wheel and a roller on a second parallel axis, with means for urging one of said axes toward the other.

In the specific form of embodiment illustrated in the accompanying drawings this machine comprises a rocking arm carrying across it a spindle to which a relatively slow movement of rotation is imparted, this spindle carrying in turn at both ends the part to be machined and the jig which are both urged during the rocking movement of the arm respectively towards a grinding wheel and a roller mounted on a common shaft parallel to the axis of the rocking movement performed by said arm, said grinding wheel being rotatably driven at a relatively high speed about said parallel shaft.

In addition, means are provided for so mounting the grinding wheel that the grinding operation may be carried out along the desired longitudinal stroke, the jig configuration and the corresponding roller configuration, as well as the mounting of said roller, being such that the grinding operation can be carried out until the desired diametral dimension of the ground part is obtained while following the contour of the same jig.

Figure 2:
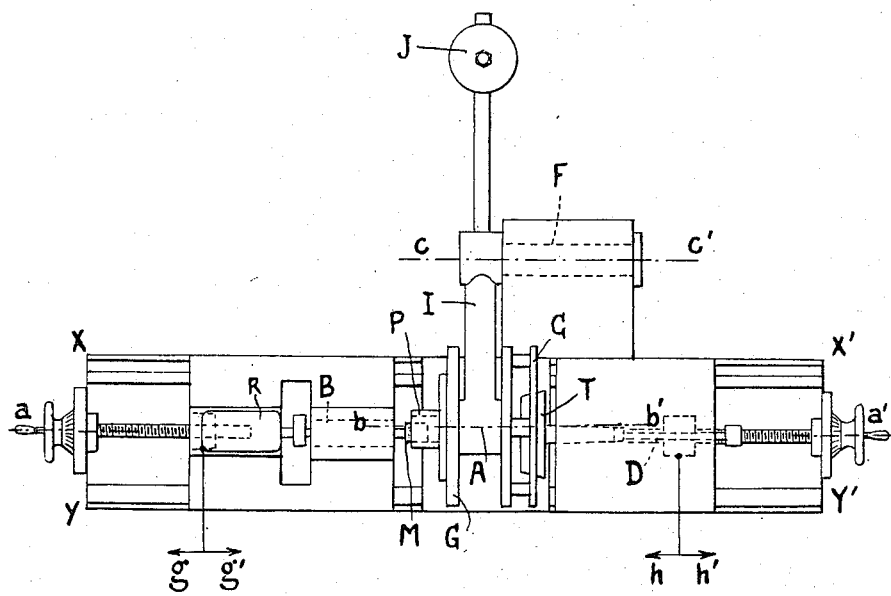
Figure 3:
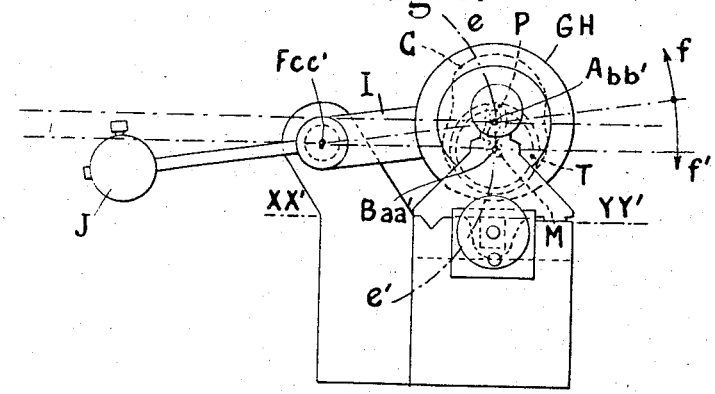
Figure 5:
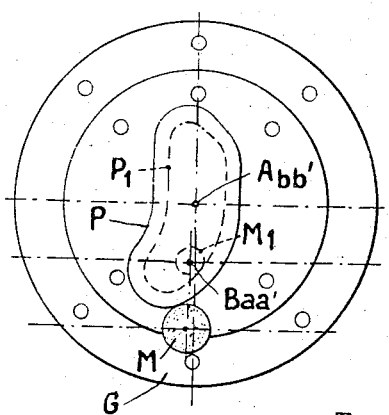
Figure 4:
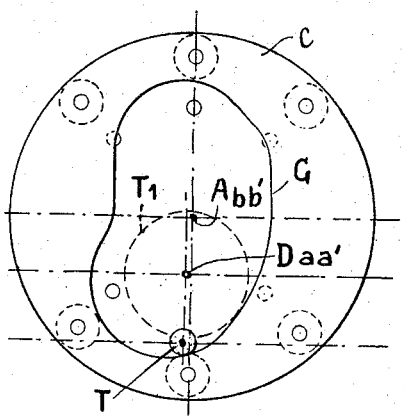
Figure 6:
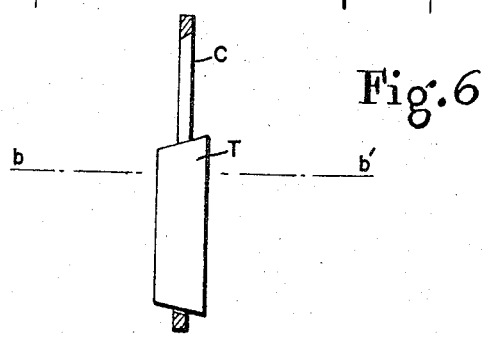

The advantageous features of this invention will appear more clearly as the following description proceeds with reference to the accompanying drawings forming part of this specification and illustrating diagrammatically the manner in which the invention may be carried out in practice. In the drawings:

FIGURE 1 is a front elevational view of a machine made in accordance with the invention;
FIGURE 2 is a top plan view thereof;
FIGURE 3 is a side elevational view thereof;
FIGURES 4 and 5 show diagrammatically, in sections respectively along lines IV—IV and V—V of FIGURE 1, the corresponding engagements, respectively of the jig against the roller and of the part to be ground against the grinding wheel; and
FIG. 6 is an enlarged fragmentary elevational view of the roller and engaged portion of the jig in the position shown in FIG. 1, the jig being broken away and shown in section to reveal its operative surface which engages the roller.

The machine according to this invention comprises a frame structure having an upper horizontal plane $xyx'y'$. On an axis $aa'$ parallel to this plane $xyx'y'$ are rotatably and slidably mounted a pair of spindles B, D carrying respectively a grinding wheel M and a roller T of peripheral frusto-conical surface having generatrices meeting axis $aa'$ with a tapering angle. These two spindles are mounted for independent sliding motion along the axis $aa'$ consisting in practice of a shaft on which said spindles B, D can be locked at will after their proper or desired longitudinal positions have been determined by moving said spindles in the direction of the arrows $g$, $g'$, $h$, $h'$. An electromotor R is provided for driving the grinding wheel M at a relatively high rotational speed, the roller T revolving freely.

About an axis $cc'$ parallel to said axis $aa'$ an arm I is pivotally mounted, for example by means of a spindle F, this arm I carrying across one end another spindle A concentric to an axis $bb'$ parallel to axes $aa'$ and $cc'$. The ends of this spindle A carry respectively plates G and H adapted to have secured thereon the former the part P to be machined and the latter a jig C. As shown in FIGURE 6 of the drawings the operative surface of this jig C is a regulated surface of which the generatrices each converge with a common axis which, when the jig is mounted on its plate H, coincides with the axis $bb'$ of spindle A at an angle which is equal to the tapering angle of the frusto-conical surface of roller T. Mechanical means drive simultaneously at the same, relatively slow speed, the plates G and H and therefore the part P to be ground and the jig C. Moreover, the arm I carries a balance weight J tending to tilt the arm. This balance weight is detachable and its position on said arm I may be adjusted to produce a rocking torque having the desired direction and force.

FIGURE 3 shows the use of the machine according to this invention for grinding an external contour. The arm I, during its rocking movement about the axis $cc'$, causes in this FIGURE 3 the displacement of point A along a circle $ee'$ containing the point B. Due to the force exerted by the balance weight J selectively disposed on arm I the movement takes place in the direction of the arrow $f$ and causes the contour of jig C which is an internal contour as shown in FIGURES 1 and 4 to engage the contour of the roller T, these two contours being then tangent to each other along a common generatrix. Then the grinding wheel M will grind the contour of the part P to be machined during a complete revolution of this part and also of the jig C, and during this revolution the jig will roll along the operative surface of the roller T, as shown in full lines in FIGURES 4 and 5. By causing the grinding wheel M to slide longitudinally along the axis $aa'$ the grinding operation may be carried out along the desired length or longitudinal distance of the part to be ground. By locking the roller T in the desired longitudinal position on the same axis $aa'$ the diametral dimension of the ground part may be set at the selected value according to the contour of jig C.

With the same jig C it is possible to grind an internal contour. To this end, and as shown in broken lines in FIGURES 4 and 5, there is used a roller such as $T_1$ and a grinding wheel such as $M_1$ grinding in the part mounted on the machine an internal contour as denoted at $P_1$.

A modified form of embodiment of this invention may consist in substituting a carriage or slide movable at right angles to the axis $aa'$, $bb'$ for the rocking arm I.

Furthermore, a displacement or rocking movement of the axis $aa'$ at right angles to this axis $bb'$ could be substituted for the movement of axis $bb'$.

Finally, various modifications may be brought in the practical construction of the machine described hereinabove by way of example, without departing however from the spirit and scope of the invention, as set forth in the appended claims. Thus, notably, the balance-weight or like weight J causing the movement of the arm carrying the part and jig P, C could be replaced with any other suitable elastic means.

What I claim is:

1. A machine for grinding a part by means of a grinding wheel according to the contour of a jig followed by a roller, which comprises a first shaft rotatably driven about its axis at a relatively low speed, means for coupling said part to be ground and said jig to said shaft for simultaneous rotation of said part and said jig at the same rate, two other shafts mounted on a common axis parallel to the axis of said first shaft and together comprising a second shaft rotatably driven at a relatively high speed and having mounted thereon the grinding wheel revolving bodily with said second shaft, and a third shaft revolving freely and carrying said roller, said roller being selectively and adjustably movable along said common axis and adapted to be locked in the desired axial position thereon and being peripherally shaped with a frusto-conical surface having generatrices each of which meets said axis of said second and third shafts at a common angle, and said jig being peripherally shaped in a regulated surface having generatrices each of which meets the axis of the first shaft with the aforesaid angle, means carrying the first shaft assembly and the assembly of the second and third shafts and permitting a movement of one of said assemblies towards and away from the other assembly in which the axis of said first shaft remains parallel to the common axis of said other two shafts, and thrust means causing said movement in a direction urging said jig into guiding engagement with the roller and said part to be ground into abrading engagement with said grinding wheel.

2. A machine as set forth in claim 1, wherein said grinding wheel is movably mounted and adapted to be locked in selected adjusted position along said common axis for successive registry with the entire length of the part to be ground.

3. A machine as set forth in claim 1, wherein said means carrying the first shaft and the assembly of the second and third shafts consist of a frame structure, means journalling said second and third shafts along said common axis on said frame structure, an arm, pivot means mounting said arm on said frame structure for pivotal movement about an axis parallel to said common axis first series, an arm provided with a pair of trunnions engaging the bearings of said second series and carrying at its end said first shaft parallel to said trunnions.

4. A machine as set forth in claim 3, wherein said journalling means and said first shaft are equally spaced from said pivotal axis.

5. A machine as set forth in claim 3, wherein said thrust means consists of a weight carried by said arm, said weight being so locked on said arm with respect to said trunnions as to act by gravity in the direction of the relative movement of said first shaft and of the assembly of said other two shafts which urges jig towards said roller.

6. A machine for grinding a part by means of a grinding wheel according to the contour of a jig followed by a roller, which comprises a frame structure, two shafts mounted on said frame structure and having a common axis, one of said shafts carrying the grinding wheel for rotation therewith, and being rotatably driven at a relatively high speed, the other one of said two shafts carrying said roller also rotatably therewith, and adjustable along said common axis, said roller revolving freely with said other shaft and being peripherally limited by a frustoconical surface having generatrices each of which meets said common axis at a tapering angle, an arm pivotally mounted on said frame structure about another axis parallel to said common axis of said two shafts, a third shaft rotatably mounted on the end of said arm and parallel to said shafts carrying said grinding wheel and said roller, said third shaft being rotatably driven at a relatively low speed and having rigidly mounted thereon the part to be ground and the jig, whereby said part and said jig register respectively with said grinding wheel and said roller, said jig having a contour bounded by a frustum of a regulated surface having generatrices each of which meets said first axis with an angle equal to the tapering angle of said frustoconical roller surface, and a balance weight mounted on said arm and urging by gravity the shaft carrying said part and said jig to a position of engagement of said jig contour with the roller contour.

References Cited

UNITED STATES PATENTS

| 286,663 | 10/1883 | Wheeler | 51—101 |
| 2,037,796 | 5/1936 | Johnston | 51—101 |
| 2,191,898 | 2/1940 | Nelson | 51—101 |
| 2,334,938 | 11/1943 | Lang | 51—101 |

ROBERT C. RIORDON, *Primary Examiner.*

D. G. KELLY, *Assistant Examiner.*